United States Patent
Berg et al.

[15] 3,696,711
[45] Oct. 10, 1972

[54] ROLL DIAPHRAGM BRAKE

[72] Inventors: Arthur A. Berg, Lincolnwood; Boleslaw Klimek, Des Plaines, both of Ill.

[73] Assignee: The Berg Manufacturing Company, Des Plaines, Ill.

[22] Filed: Dec. 28, 1970

[21] Appl. No.: 101,914

Related U.S. Application Data

[63] Continuation-in-part of Ser. No. 26,001, April 6, 1970, abandoned.

[52] U.S. Cl. ............................92/48, 92/63, 92/64, 92/130, 92/165, 92/168, 188/170
[51] Int. Cl. .................................................F01b 19/00
[58] Field of Search....92/63, 64, 165, 166, 168, 130, 92/48; 188/170

[56] References Cited

UNITED STATES PATENTS

| | | |
|---|---|---|
| 3,439,585 | 4/1969 | Herrera ........................92/64 |
| 3,385,173 | 5/1968 | Euga ..........................92/64 X |
| 2,367,852 | 1/1945 | Eaton .........................92/64 X |
| 3,446,241 | 5/1969 | Skoli ..........................92/62 X |
| 2,854,954 | 10/1958 | Howze ........................92/64 X |
| 3,131,609 | 5/1964 | Dobriken et al................92/63 |
| 3,331,291 | 7/1967 | Rumsey ..........................92/64 |
| 3,508,469 | 4/1970 | Williams .....................92/64 X |
| 3,515,438 | 6/1970 | Stevenson et al. ..........92/64 X |

*Primary Examiner*—Martin P. Schwadron
*Assistant Examiner*—Leslie J. Payne
*Attorney*—Parker, Carter & Markey

[57] ABSTRACT

A light weight, compact service and emergency brake assembly employing a roll diaphragm in the emergency chamber, a rearwardly extending mechanical release, a cup-shaped movable wall carrying one end of the roll diaphragm and having an axial member riding on the inner and outer sides of an integral housing sleeve. A service chamber has two diaphragms with seal means carried by one diaphragm to preclude loss of service pressure.

3 Claims, 2 Drawing Figures

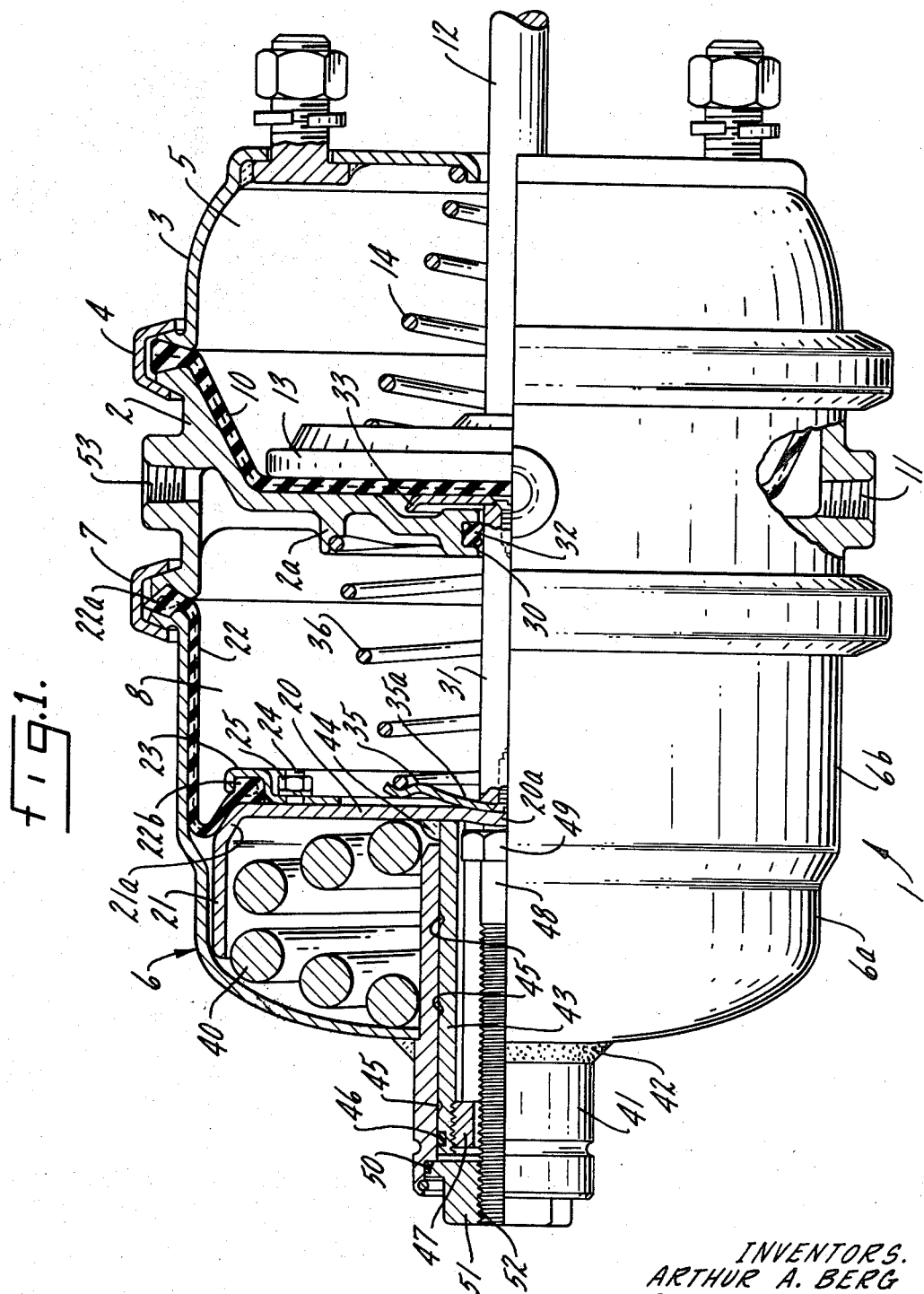

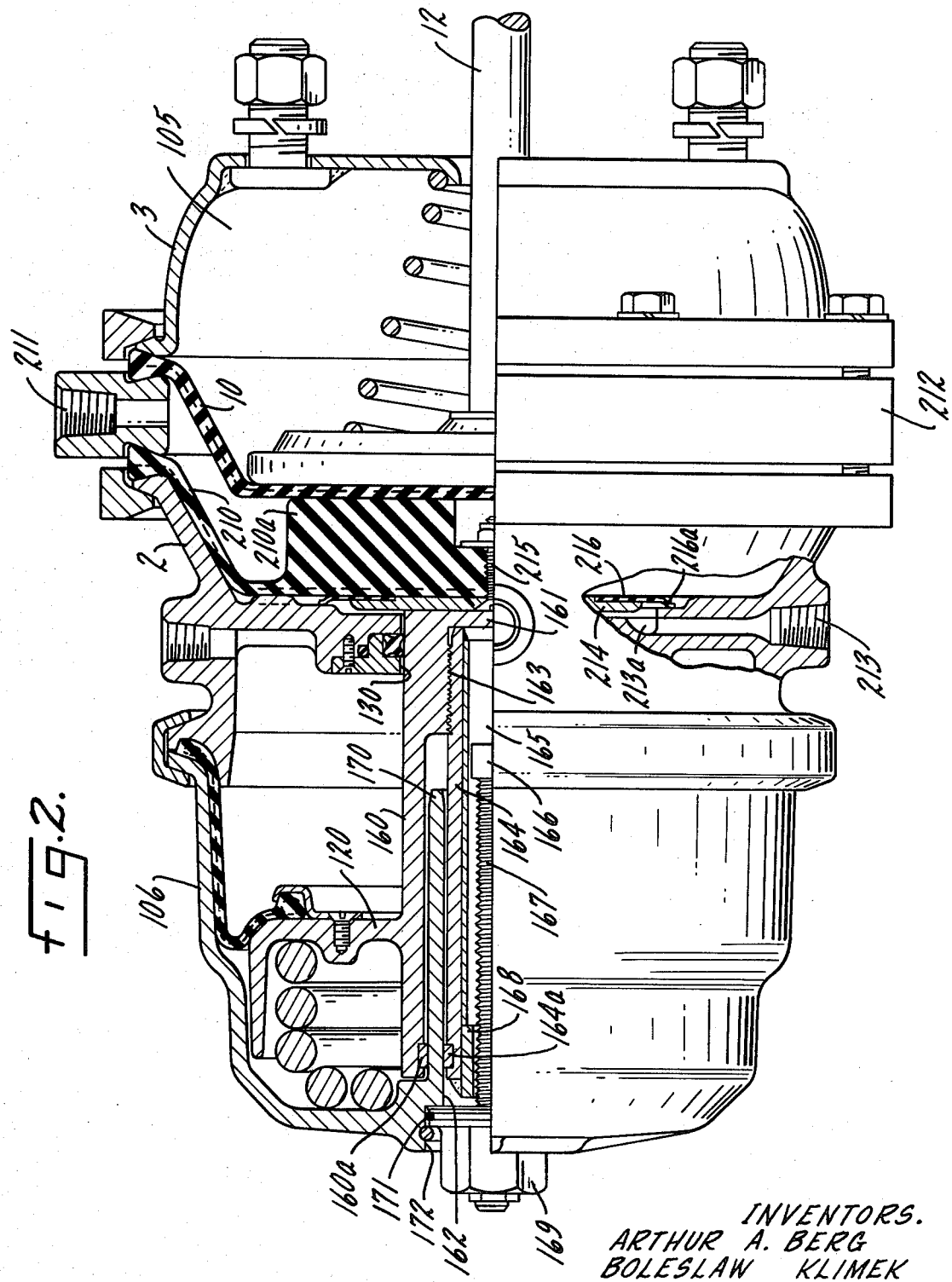

ROLL DIAPHRAGM BRAKE

SUMMARY OF THE INVENTION

This application is a continuation-in-part of copending application, Ser. No. 26,001, filed Apr. 6, 1970 now abandoned, entitled "Roll Diaphragm Brake."

This invention relates to brakes for vehicles and particularly to combination service and emergency brake actuator assemblies.

One purpose of the invention is to provide a brake assembly productive of more linear force output per unit of pressure rise therewith.

Another purpose is to provide a brake actuator free of need for anti-drag system elements.

Another purpose is to provide a service and emergency brake assembly of minimum weight, maximum compactness and maximum economy and efficiency in manufacture.

Another purpose is to provide a brake assembly having unique emergency brake deactivating means.

Another purpose is to provide a brake actuator of smaller diameter and a shorter length without sacrifice of strength and durability.

Another purpose is to provide a brake assembly having separate piston and actuating rod means.

Another purpose is to provide a brake actuator productive of lower spring stress and longer spring life.

Another purpose is to provide a combination release and guide means for emergency spring brake chambers.

Another purpose is to provide a dual-diaphragm service chamber having means precluding undesirable fluid pressure flow.

Other purposes may appear from time to time during the course of the specification and claims.

BRIEF DESCRIPTION OF THE DISCLOSURE

The invention is illustrated more or less diagrammatically in the accompanying drawings, wherein:

FIG. 1 is a side view in partial cross section; and

FIG. 2 is a side view in partial cross section of a variant form of the invention.

Like parts are indicated by like numerals throughout the specification and drawings.

DESCRIPTION OF THE PREFERRED EMBODIMENT

Referring to the drawings, the numeral 1 generally designates a housing. The housing 1 is conveniently formed of three parts. A central dividing wall 2 is preferably formed of a relatively light casting. A first dish-shaped housing portion 3 is conveniently formed of relatively thin metal, the opposed peripheries of the parts 2,3 being clamped as by clamp ring 4 to define a service chamber 5 therebetween.

Similarly, a second dish-shaped housing portion 6, of somewhat greater depth than portion 3, may be suitably formed of relatively thin metal and may have its periphery joined, as by clamp ring 7, to an opposed peripheral portion of intermediate wall 2 to define therebetween aemergency chamber 8.

A movable wall, such as the diaphragm 10, divides the chamber 5. In the case of the diaphragm 10, its peripheral portion is clamped between the opposed peripheral surfaces of the parts 2,3. A fluid pressure inlet 11 is formed in the wall casting 2 for delivery of fluid pressure to one side of the wall 10. A brake-actuating rod 12 carries plate 13 in engagement with the opposite side of wall 10 and the rod 12 extends outwardly of housing part 3 for actuation of the vehicle brakes (not shown). Spring 14 engages the end wall of housing part 3 and the plate 13 to urge the latter toward wall 10 and the rod 12 away from brake-actuating position.

A second movable wall 20 is positioned in chamber 8 and may be suitably formed of relatively thin metal, as shown. The wall 20 includes a circumferential rearwardly extending portion 21. When the wall 20 is in its rearmost nonbrake-actuating position, as shown in the drawing, the circumferential wall portion 20 is received within a reduced rear diameter portion 6a of the housing part 6.

A flexible sleeve or roll diaphragm 22 has one of its circumferential end portions 22a clamped between opposed peripheral surfaces of housing parts 2,6 and its opposite circumferential end portion 22b clamped to a forward peripheral surface of the wall 20 as by clamp ring 23. The ring 23 is suitably secured to the forward surface of wall 20 as by bolts 24 tacked to said wall and extending forwardly therefrom at circumferentially spaced positions thereon, said bolts 24 carrying nuts 25. It will be observed that the opposite end portions of the sleeve 22 are preferably enlarged, as indicated at 22a, 22b, and that the clamping surfaces of housing parts 2,6 and ring 23 are correspondingly formed for reception of said enlarged end portions. The major diameter portion 6b of housing part 6 has the sleeve 22 lying thereagainst and therealong when the parts are in the position shown in the drawings. It will be understood that as wall 20 moves toward housing divider part 2 the sleeve 22 will roll along and lie against the outer surface of circumferential wall portion 21, the space between housing part 6a and wall 21 providing for a smooth flexing or rolling of the sleeve or roll diaphragm 22 as the wall 20 moves in either direction. Similarly, walls 20,21 are joined by an angled annular portion 21a against which sleeve 22 lies with the parts in the position shown.

The divider wall portion 2a of housing part 2 is centrally apertured as indicated at 30 for passage therethrough of actuating rod segment 31, the seal 32 being carried by web or wall portion 2a for engagement with the rod segment 31. Within chamber 5 rod segment 31 carries a pad element 33 for engagement with wall 10 on the side to which fluid pressure is deliverable through inlet 11. At its opposite end the rod segment 31 carries a retainer plate 35. Spring 36 has its opposite ends in engagement with wall portion 2a and retainer 35 to urge the rod segment toward wall 20 and away from wall 10. Wall 20 has a central depression 20a in which the concave, convex center segment 35a of retainer 35 corresponds and within which the center portion of retainer 35 seats. With the parts in the position shown, springs 14 and 36 both urge retainer 35 into position against the center concave 20a of wall 20. It will be understood, however, that upon movement of wall 10 by fluid pressure entering at 11, the spring 14 will be compressed while spring 36 continues to urge retainer 35 and rod 31 toward the positions shown.

A powerful, emergency brake-applying means is provided in the spring 40, having its opposite ends engaging the rear wall of housing part 6 and the rear surface of wall 20. With the parts in the position shown, the spring 40 is received within the circumferential portion 21 of wall 20.

An elongated sleeve 41 is secured to the rear wall of housing part 6 as by the weldment 42, for example. Sleeve 41 extends a substantial distance in opposite directions from the rear wall of housing part 6, its inner portion serving, with wall 21, as a centering means for spring 40.

Wall 20 has secured thereto and extending rearwardly from its rear surface a second hollow sleeve 43. Weldment 44 is effective to secure the sleeve 43 to wall 20. A spiral groove 45 is formed in the outer surface of sleeve 43 for provision of lubricant between the slidably engaged sleeves 41,43. Seal 46 is carried at the distal end of sleeve 43 for engagement with the inner surface of sleeve 41.

An abutment means 47 takes the form of a ring threadably received in the open distal end of sleeve 43 and extending inwardly from its inner surface. The major inner surface of sleeve 43 is hexagonal in cross sectional configuration. Bolt 48 carries hexagonal head 49, the diameter of which is such as to engage the hexagonal inner surface of sleeve 43 and to prevent relative rotation between bolt 48 and sleeve 43. A countersink 50 is formed in the outer open end of sleeve 41 for reception of nut 51 rotatably therein, the nut 51 having a tool-engageable portion extending outwardly beyond sleeve 41. Nut 51 is internally threaded and threadably engages the externally threaded surface of bolt 49, as indicated at 52. It will be observed that abutment 47 closely approaches the threaded portion of bolt 48 and is therefore aligned with head 49.

Referring now to FIG. 2, it will be observed that movable wall member 120 has integrally formed therewith a forward and rearwardly extending axial member, the forward portion of which extends through a central opening 130 in casting 2 and is closed to provide a contact surface to operate elements within the service chamber 105. The axial extension of member 120, indicated by the numeral 160, thus comprises an elongated cup-shaped member having its closed forward end 161 presented to service chamber 105 and its opposite open end 162 presented to the rear wall of emergency chamber 106.

The base of the well within member 160 is threaded, as indicated at 163, for reception of a release sleeve member 164, the internal area 165 of which is noncircular for slidable reception of nut 166 on threaded shaft 167. It will be observed that the threaded base portion of the well in member 160 is reduced and that the inner diameter of the remainder of member 160 is substantially greater than the outside diameter of sleeve 164. The annular space thus created is formed and adapted for reception therewithin of an elongated, inwardly extending, axial sleeve 170 carried by, and as shown formed integrally therewith, the rear wall of chamber housing 106. Guide elements or rings 160a and 164a are carried adjacent the inner end portion of member 160 and the outer end portion of member 164, respectively, for sliding and guiding engagement with the outer and inner surfaces, respectively, of sleeve 170. Secured to the inner end portion of member 164 is an annular abutment 168 positioned for engagement by member 166. The bolt 167 carries head 169 externally of housing 106. The head 169 carries a seal 171 for engagement with the inner circumferential wall of a recess 172 formed in the outer end surface of chamber housing 106.

The chamber 105 carries, in addition to the diaphragm 10, a second diaphragm 210 spaced from and aligned with the diaphragm 10, the diaphragm 210 carrying a central annular block or mass 210a shown as formed integrally with the diaphragm 210 and extending toward the diaphragm 10 to space the same when the parts are in the at-rest position shown in FIG. 2 and when diaphragm 210 is operative.

A service pressure inlet 211 is formed in a ring 212 positioned between housing part 3 and central casting 2 and between the diaphragms 10,210 for delivery of service pressure to the area between the diaphragms 10,210. A third inlet 213 is formed in the central casting 2 for delivery of fluid pressure between the casting 2 and diaphragm 210. A push plate 214 is secured to the surface of diaphragm 210 opposed to central casting 2 and opposite that carrying the block 210a, the plate 214 being in contact with end 161 of member 160 and secured, for example, to diaphragm 210 by a suitable fastener such as that illustrated at 215.

A flapper valve or seal means 216 takes the form of an annular piece of flexible or rubberlike material, the inner portion of which is clamped to the diaphragm 210 by plate 214, the outer peripheral portion of which forms an angularly disposed skirt directed toward the face of casting 2 opposed to diaphragm 210. It will be observed that member 216 is of sufficient diameter to cause the skirt portion 216a to contact the casting 2 entirely about the inlet end of inlet 213a when the diaphragm 210 is in its at-rest position shown in FIG. 2.

The use and operation of the invention are as follows:

The brake assembly of the invention is constructed at minimum cost, the housing being formed of a single casting and a pair of dish-shaped members formed of relatively thin metal. Similarly, the employment of flexible sleeve or roll diaphragm 22 permits formation of movable wall 20 of relatively thin metal.

In normal operation depression by the vehicle operator of the brake pedal (not shown) results in delivery of fluid pressure at inlet 11 causing movement of wall 10, plate 13 and actuating rod 12 toward brakes-on position, or to the right as the parts are shown.

In such normal operation fluid pressure is maintained, through emergency inlet 53 on one side of wall 20 in chamber 8, i.e., between wall 20 and wall portion 2a, thus retaining the parts in chamber 8 in the position shown. In response to diminution of said pressure in chamber 8, spring 40 is effective to move wall 20, retainer 35, rod segment 31 and pad 33 toward brakes-on position, or to the right as the parts are shown, resulting in movement of wall 10, pad 13 and actuating rod 12 in said direction toward brakes-on position.

Elongated sleeves 43,41 insure against canting or binding of wall 20. The dished or concaves 20a in wall 20 and 35a in retainer 35 insure axial alignment of wall 20 and rod segment 31 and work against binding of rod segment 31 in aperture 30.

As wall 20 moves in said brakes-on direction, sleeve 22 is smoothly rolled off the inner surface of housing part 6b and onto the outer surface of circumferential wall portion 21 without strain or stretching of the material of sleeve 22. The space provided by the greater diameter of housing portion 6b between said housing portion and wall 21 and the dimensioning of sleeve 22 provides for positioning of the sleeve 22 in the position shown in response to fluid pressure in chamber 8 and the rolling of sleeve 22 from said position onto wall portion 21 as the wall 20 moves toward brakes-on position. Thus the sleeve or roll diaphragm 22 serves as an elongated, flexible, movable seal.

Fluid pressure may be intentionally removed from chamber 8 by the vehicle operator for parking or emergency application of the brakes by spring 40 or such pressure removal by a leak or conduit breakage may produce such spring application automatically.

When the operator desires to retract or release the emergency spring brake after its application by spring 40, it is only necessary that nut 51 be rotated, the nut 51 being engageable externally of housing 1 by a suitable hand tool (not shown). Rotation of nut 51 is effective to draw bolt 48 outwardly through sleeve 41, rearwardly of housing 1, or to the left as the parts are shown. With bolt 48 in the position shown, wall 20, sleeve 43 and abutment 47 are free to travel their full stroke length toward wall portion 2a. With the bolt 48 drawn outwardly through nut 51, the head 49 engages abutment 47. Continued rotation of nut 51 draws the bolt 48, abutment 47, sleeve 43 and wall 20 rearwardly toward the end wall of housing part 6, compressing spring 40 and moving wall 20 away from brakes-on direction. Spring 36 is effective to maintain retainer 35 in engagement with wall 20 and to withdraw rod segment 31 with wall 20 as wall 20 is withdrawn. The wall 20 may thus be withdrawn and the spring 40 compressed into their positions shown in the drawing as a result of rotation of nut 51. Thereupon the housing part 6 may be removed from casting 2 upon removal of clamp ring 7 without fear of expansion or explosion of spring 40 and resulting injury to personnel. With housing part 6 thus removed from casting 2, the roll diaphragm or flexible sleeve seal 22 may be replaced without disturbance of wall 20 or spring 40.

Thus the elements 41–51 serve the dual function of centering wall 20 and providing for release of brakes applied by spring 40, the centering of wall 20 permitting space between wall 21 and housing part 6a within which roll diaphragm 22 is free to flex as wall 20 moves in either direction in chamber 8.

The roll diaphragm 22 provides the constant uniform area available with piston constructions while providing a larger effective area and lower release forces.

The structure of FIG. 2 eliminates spring 36 and the provision of elongaged sleeve 170 within the emergency chamber and the dual sleeve design of member 160 provides assured centering of the member 160, the same being centered by the seal within opening 130 and the slide rings 160a,164a engaging the inner and outer surfaces of sleeve 170.

Thy provision of dual diaphragms in chamber 105 and the inlets 211,213 contribute to the assurance of safe brake system availability. It will be understood that the inlets 211,213 could be variously connected to desired elements of the fluid pressure supply system, the inlet 211 being normally connected to the standard service system, the inlet 213 being selectively connected to the said service system, a second service system or an emergency or auxiliary system. Thus, should the diaphragm 10 fail for any reason, delivery of fluid pressure to inlet 213 would produce, through the mediacy of diaphragm 210 and block 210a, the desired movement of brake actuating rod 12 toward brakes-on position.

Should there be a failure of diaphragm 210, the valve seal member 216,216a is effective to preclude back flow of fluid pressure entering at inlet 211 outwardly through inlet 213 and thus to insure full effectiveness of service pressure entering inlet 211 and the movement of diaphragm 10 and brake rod 12 toward brakes-on position.

The embodiments of the invention in which an exclusive property or privilege is claimed are defined as follows:

1. In a spring-applied, pressure-released, fluid pressure chamber, a movable wall in said chamber, a flexible sleeve having one of its ends attached to said wall and the other of its ends attached to said chamber, the periphery of said wall being spaced from the opposed inner wall of said chamber, said flexible sleeve bridging and sealing said space, an elongated, axial, cup-shaped member secured to said movable wall and extending in opposite directions from said movable wall, the closed end of said member extending outwardly of said chamber, a first rigid, hollow sleeve secured within said member and extending the length thereof in spaced relation with the inner wall of said member, a second, rigid, hollow, axial sleeve on the rear wall of said chamber and extending inwardly of said chamber and between said inner wall of said member and said first hollow sleeve, guide means carried by said inner wall of said member and the outer wall of said first sleeve, said guide means engaging the outer and inner walls, respectively, of said second sleeve throughout the excursion of said movable wall within said chamber.

2. A brake actuating chamber having a first diaphragm dividing said chamber, a second diaphragm dividing said chamber in spaced relation with said first diaphragm, a first fluid pressure inlet positioned to deliver fluid pressure between said diaphragms, a second fluid pressure inlet positioned to deliver fluid pressure to the side of said second diaphragm opposite the side thereof opposed to said first diaphragm, and flexible valve seal means carried by said second diaphragm and positioned to seal said second inlet against the flow of fluid pressure from said first to said second inlet while permitting the flow of fluid pressure from said second inlet to said surface of said second diaphragm.

3. In a spring-applied, pressure-released fluid pressure chamber, a movable wall dividing said chamber, axial extensions fixed on said wall and extending forwardly and rearwardly therefrom, said forward extension penetrating the forward wall of said chamber in sliding, guided contact relationship therewith, an inwardly extending sleeve fixed on the rear wall of said chamber, said rearward extension penetrating said sleeve and having its rearmost segment in sliding guided contact relationship therewith, said movable wall being out of contact with said chamber except for said guiding contact of said extensions, and a flexible sleeve having its opposite ends secured to said chamber and said wall.

* * * * *